United States Patent
Stone

(10) Patent No.: US 10,549,329 B2
(45) Date of Patent: Feb. 4, 2020

(54) HORIZONTALLY WOUND COIL OF METALLURGICALLY HEAT TREATED METAL TUBING IN A MULTI-LAYERED CONFIGURATION

(71) Applicant: Inductotherm Group Australia Pty. Ltd., Seaford (AU)

(72) Inventor: Christopher Gordon Stone, Melbourne (AU)

(73) Assignee: INDUCTOTHERM GROUP AUSTRALIA PTY LTD. (AU)

( * ) Notice: Subject to any disclaimer, the term of this patent is extended or adjusted under 35 U.S.C. 154(b) by 0 days.

(21) Appl. No.: 16/114,485

(22) Filed: Aug. 28, 2018

(65) Prior Publication Data

US 2019/0084022 A1 Mar. 21, 2019

Related U.S. Application Data

(60) Provisional application No. 62/560,741, filed on Sep. 20, 2017.

(51) Int. Cl.

| B21C 47/08 | (2006.01) |
|---|---|
| B32B 15/20 | (2006.01) |
| B32B 1/08 | (2006.01) |
| B32B 15/01 | (2006.01) |
| B21C 47/02 | (2006.01) |
| F16L 11/16 | (2006.01) |
| B21C 37/12 | (2006.01) |
| B65H 55/04 | (2006.01) |
| F25B 41/00 | (2006.01) |

(52) U.S. Cl.
CPC ............ *B21C 47/08* (2013.01); *B21C 37/123* (2013.01); *B21C 37/124* (2013.01); *B21C 47/02* (2013.01); *B32B 1/08* (2013.01); *B32B 15/01* (2013.01); *B32B 15/20* (2013.01); *B65H 55/04* (2013.01); *F16L 11/16* (2013.01); *B32B 2250/04* (2013.01); *B32B 2311/12* (2013.01); *B32B 2509/10* (2013.01); *F25B 41/003* (2013.01)

(58) Field of Classification Search
CPC .......... B65H 55/04; B21C 47/02; B21C 47/08
See application file for complete search history.

(56) References Cited

FOREIGN PATENT DOCUMENTS

| WO | WO-2016129681 A1 * | 8/2016 | ............. B65H 55/02 |

OTHER PUBLICATIONS

Machine Translation of WO 2016/129681 A1, dated Aug. 18, 2016. (Year: 2016).*

* cited by examiner

*Primary Examiner* — William E Dondero
(74) *Attorney, Agent, or Firm* — Philip O. Post

(57) ABSTRACT

A horizontally wound continuous coil of metallurgically heat treated metal tubing is alternatively formed in a multi-layered configuration using a sequential four-layer or two-layer pattern of winding layer groups. The method of sequential four-layer or two-layer patterning of winding groups support formation of jumbo horizontally wound coils of continuous annealed copper tubing for use by end users of annealed copper tubing.

3 Claims, 3 Drawing Sheets

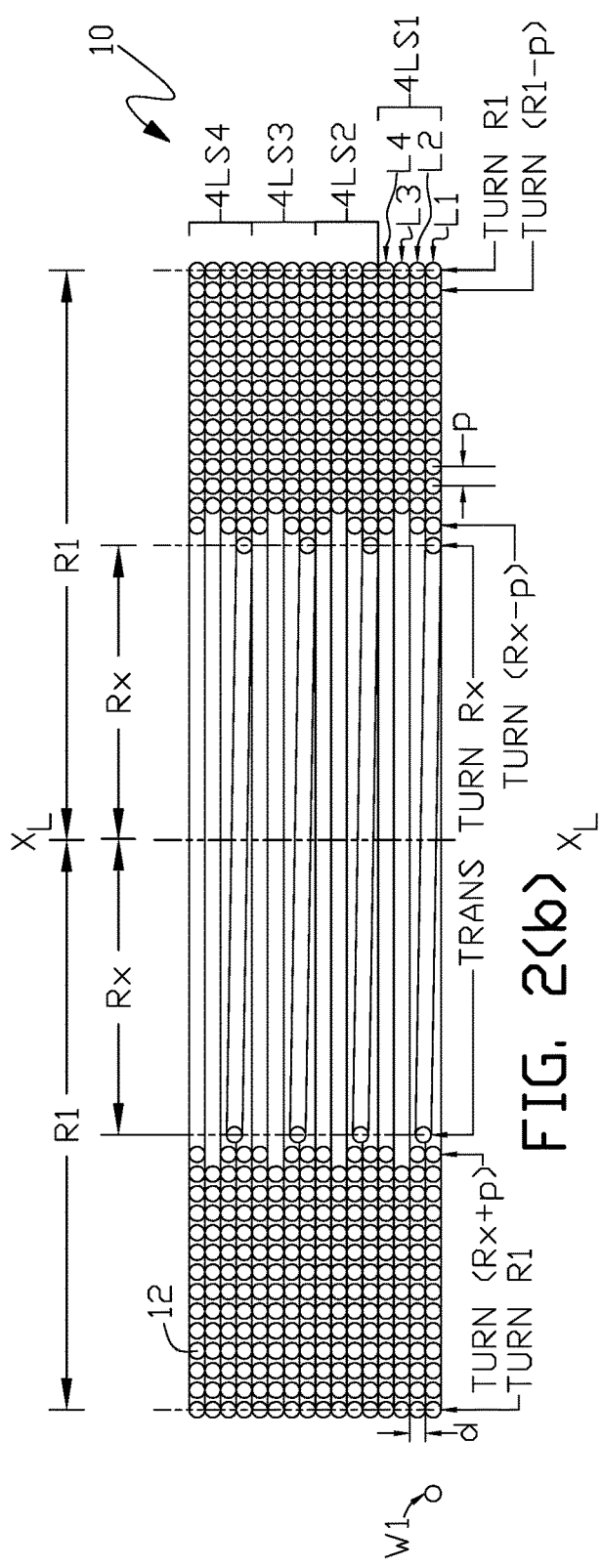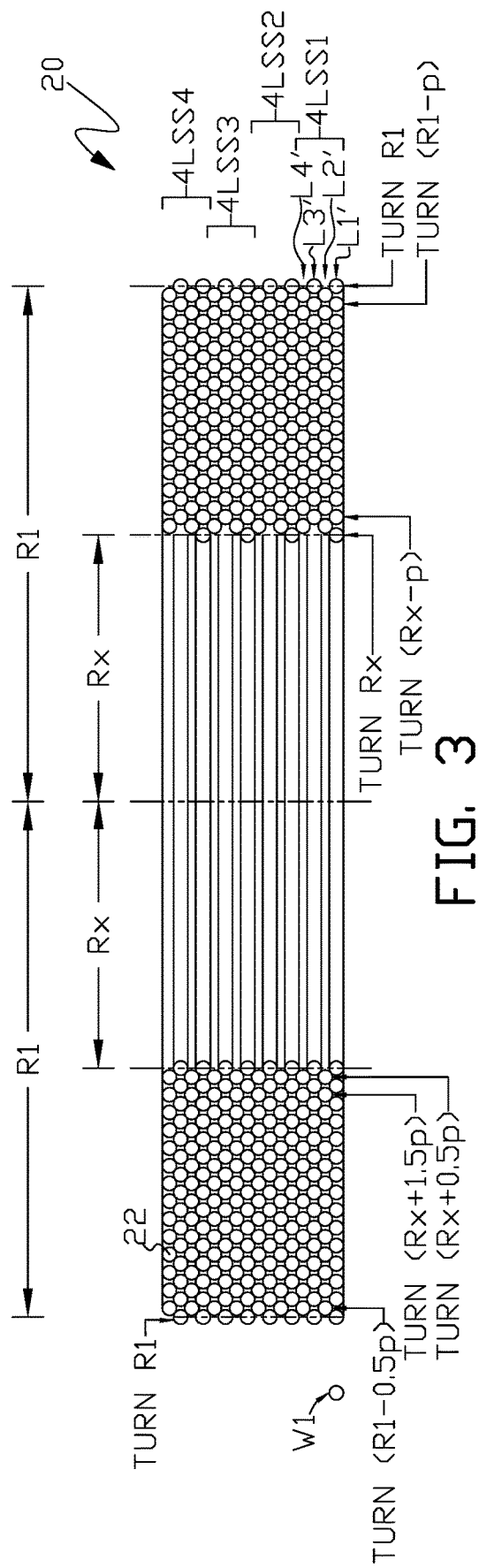

HORIZONTALLY WOUND COIL OF METALLURGICALLY HEAT TREATED METAL TUBING IN A MULTI-LAYERED CONFIGURATION

CROSS REFERENCE TO RELATED APPLICATIONS

This application claims the benefit of U.S. Provisional Application No. 62/560,741, filed Sep. 20, 2017, hereby incorporated by reference in its entirety.

FIELD OF THE INVENTION

The present invention relates generally to metallurgically heat treated metal tubing arranged in a multi-layered configuration in a long continuous length for delivery to an end user of the heat treated metal tubing in applications where multiple shorter lengths of the metal tubing are drawn and cut from the long continuous length of metal tubing.

BACKGROUND OF THE INVENTION

Metallurgically heat treated metal tubing is used in a wide variety of technical applications. For example annealed (also referred to as soft or ductile) copper tubing is widely used for refrigerant lines in air conditioners and heat pumps. Work hardening in the initial formation of copper tubing makes the copper hard or rigid and it must be annealed to make it soft again for use by an end user.

Long continuous lengths of metallurgically heat treated metal tubing can be produced in different multi-layered configurations at the location of final heat treatment as the end user product for delivery to the end user. For example there is known in the art "level wound coil" (LWC) configurations where typically the metal tubing is wound around a mandrel (bobbin, spool, reel or other shaping tool) on the horizontal where all of the corresponding windings of tubing in each layer are horizontally wound on top of each other (like a cotton reel); hence the terminology "level wound (continuous) coil".

Additionally end user continuous metal tubing in multi-layer configurations (referred to as "lay stack" herein for convenience) can be differentiated on whether the end user lay stack is formed prior or subsequent to final heat treatment. The two different methods are described herein as an example for copper tubing where the heat treatment is an annealing process but can be used for other types of metal tubing and heat treatment processes.

In the first method of producing an end user lay stack of annealed copper tubing, which can be referred to as a batch tubing heat treatment method, a lay stack of hard copper tubing is first produced and the lay stack of hard copper tubing is placed in a furnace, such as a fossil fuel furnace, or electric element to heat anneal the hard copper tubing to an appropriate (light or soft) annealing temperature. The batch annealed lay stack of copper tubing is then packaged for delivery to an end user of the batch annealed copper tubing where selected lengths of tubing are drawn and cut from the lay stack of annealed copper tubing. In this annealing process the method of winding the layers (also referred to as levels) of the lay stack of hard copper metal tubing is preferably accomplished to satisfy two purposes: minimizing any sticking together of adjacent windings of the tubing in the same layer of the tubing or in adjacent layers above or below a particular layer; and facilitating drawing lengths of the annealed copper tubing from the lay stack of annealed copper metal tubing by the end user.

International patent application PCT/JP2016/054163 discloses a lay stack configuration (also referred to herein as "geometry") that is identified as a spiral coil lamination (that is, composed of layers) where the metal tubing is spirally wound into an end user product without a mandrel or other shaping tool that can be particularly suited for a batch tubing heat treatment method. With reference to the drawing reference number used in the figures of the application, multiple spiral layers (or levels) (3) formed from the metal tubing (2) are wound into a spiral and layered in the direction in which the central axis of the coil layered body extends. A-layer spiral coils (3a) the innermost side (5a) of which is connected to the innermost side (5b) of a spiral coil one layer higher and the outermost side (4a) of which is connected to the outermost side (4b) of a spiral coil one layer lower; and B-layer spiral coils (3b) the outermost side (4b) of which is connected to the outermost side (4a) of a spiral coil one layer higher and the innermost side (5b) of which is connected to the innermost side (5a) of the spiral coil one layer lower. The A-layer spiral coils (3a) and the B-layer spiral coils (3b) are repeated alternately, and the radius of curvature for the metal tubing (2) of each spiral coil (3) changes continuously and the metal tubing is wound so that the gap between adjacent metal tubing (2) is smaller than the diameter of the metal tubing.

After formation of the spiral coil lamination as described in the previous paragraph, the spiral coil lamination is bundled with a metal band so that the described multi-level spiral configuration (geometry) does not collapse and is then batch annealed in a final annealing furnace to manufacture the end user spiral coil lamination as disclosed in paragraph [0045] of international patent application PCT/JP2016/054163.

A second method of producing a lay stack of annealed copper (or other metal) tubing is to process a continuous length of hard copper tubing equal to the length of continuous tubing in the desired end user lay stack of annealed copper tubing through an annealing heating device, such as an electric inductor (also referred to as an induction coil) annealing system to heat anneal the tubing and then coil the linear length of annealed tubing into a lay stack with a coil stack casting arm as known in the art that feeds the annealed copper tubing into a receiving mechanism as known in the art with a particular multi-layer spiral configuration (or geometry). In this annealing process the method of winding the layers (or levels) of the lay stack of annealed metal tubing is preferably accomplished to facilitate drawing of the annealed metal tubing from the lay stack by the end user.

Most generally the final end user lay stack product of annealed copper tubing consists of adjacent horizontally wound layers of annealed tubing laid down in alternating "outer-radius to inner-radius" winding layers and "inner-radius-to-outer-radius" winding layers.

The end user (final product) lay stack of annealed copper tubing produced by either method can be optionally packaged with support structures to retain the original spirally wound configuration or geometry. However in many instances the packaging of the final product comprises placing the multi-layer spiral configuration of continuous annealed copper tubing (hard copper tubing in the first method above and annealed copper tubing in the second method) on a suitable flat transport structure, such as a pallet, without additional support structures and then shrinking wrapping (or otherwise containing) the lay stack of annealed copper tubing to the flat transport structure for shipping to the end user.

BRIEF SUMMARY OF THE INVENTION

In one aspect the present invention is a method of producing a lay stack of heat treated metal tubing for an end user in a horizontally wound coil configuration or geometry without a mandrel or other shaping tool as disclosed herein that facilitates forming the windings of the metal tubing in each of the layers in the lay stack and the formation of jumbo horizontally wound coils of heat treated metal tubing.

In another aspect the present invention is a lay stack of heat treated metal tubing in a horizontally wound coil configuration or geometry without a mandrel or other shaping tool as disclosed herein that facilitates drawing heat treated metal tubing from the lay stack of annealed metal tubing.

The above and other aspects of the present invention are set forth in this specification and the appended claims.

The above methods and lay stacks of heat treated metal tubing in a horizontally wound coil configuration of the present invention as disclosed herein are of particular use where the heat treated metal tubing is annealed copper tubing.

BRIEF DESCRIPTION OF THE DRAWINGS

The appended drawings, as briefly summarized below, are provided for exemplary understanding of the invention, and do not limit the invention as further set forth in this specification and the appended claims.

FIG. 2(*b*) is a cross sectional elevation view of the horizontally wound coil shown in FIG. 1 through line A-A illustrating the horizontally wound coil geometry of the horizontally wound coil in FIG. 1 where the final product horizontally wound coil geometry consists of four sequential four-layer groups of metal tubing shown in FIG. 2(*a*).

FIG. 3 is a cross sectional elevation view of another embodiment of a horizontally wound coil of a lay stack of heat treated metal tubing horizontally where the final product end user horizontally wound coil geometry consists of four sequential four-layer groups of metal tubing as disclosed herein.

DETAILED DESCRIPTION OF THE INVENTION

Figure 1:
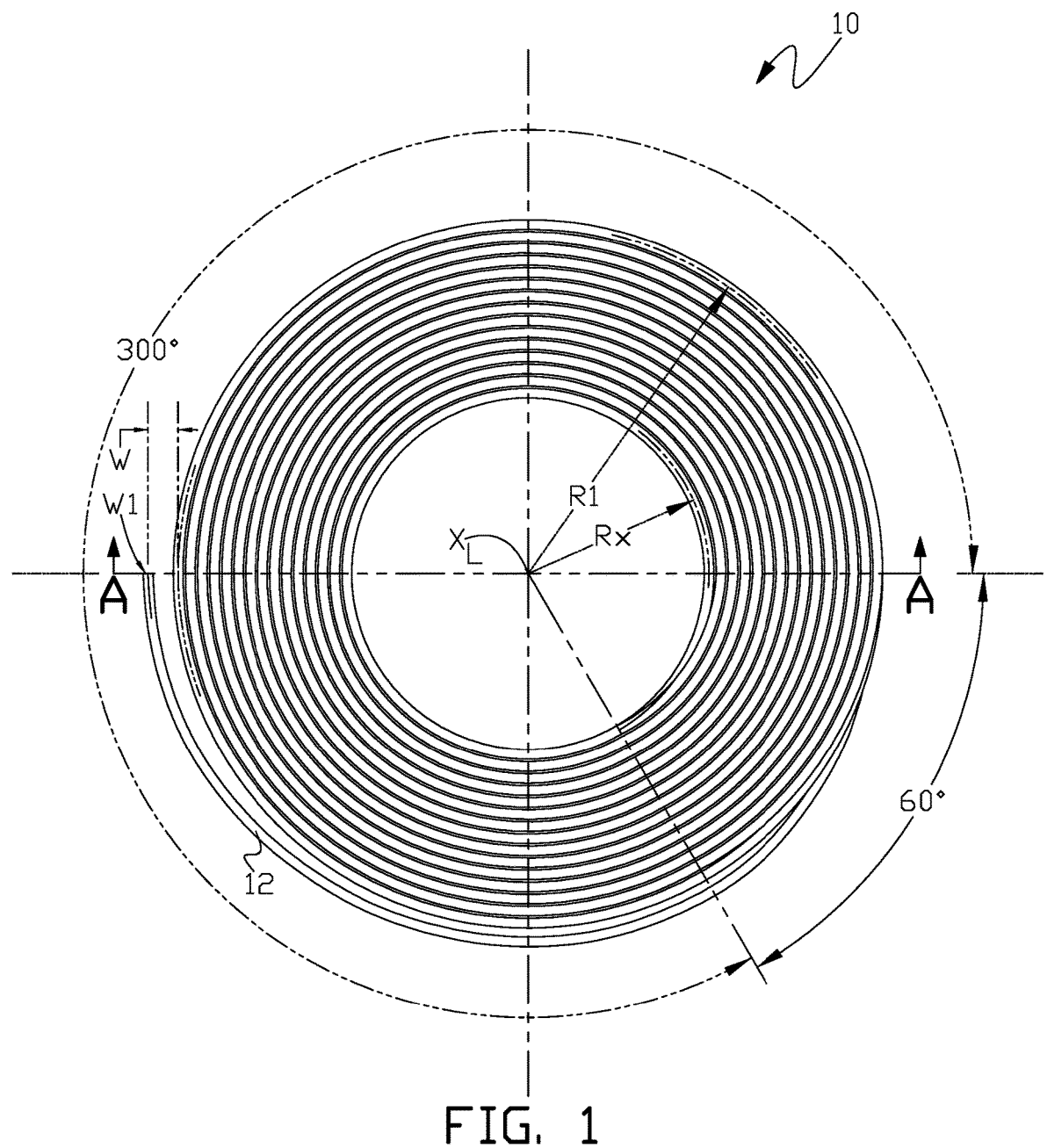
FIG. 1 is a top plan view of one embodiment of a horizontally wound coil of a lay stack of heat treated metal tubing of the present invention.
Figure 2A:
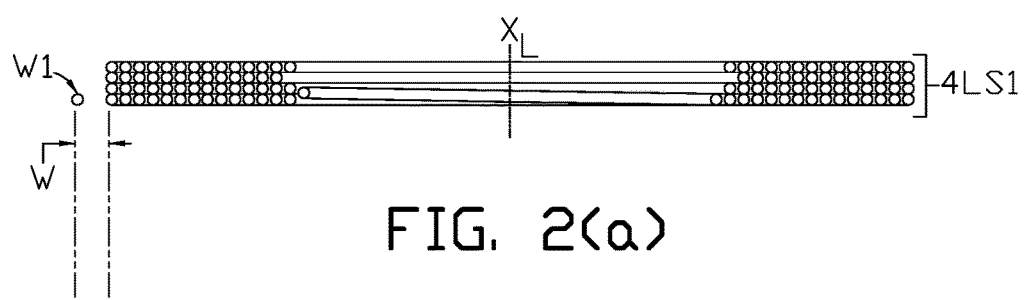
FIG. 2(*a*) is a partial cross sectional elevation view of the horizontally wound coil shown in FIG. 1 through line A-A illustrating the horizontally wound coil geometry of the lowest (bottom) four-layer group of heat treated metal tubing that is sequentially repeated around the height of the central axis $X_L$ of the horizontally wound coil to build up the height of a final product horizontally wound coil of the present invention.

There is shown in FIG. 1, FIG. 2(*a*) and FIG. 2(*b*) one embodiment of a horizontally (or horizontal) wound coil 10 of the present invention that for convenience is also referred to as a "HWC".

In one embodiment of the invention HWC 10 can be formed by feeding a linear heat treated metal tubing, for example annealed copper tubing, exiting an electric inductor annealing system to a casting arm apparatus as known in the art that feeds the annealed copper tubing into a receiving coiler apparatus as known in the art in which the configuration of HWC 10 is formed. Generally herein feeding linear heat treated metal tubing is also referred to as a linear feed of the heat treated metal tubing. The casting arm apparatus comprises a metal tubing casting head with one or more rollers and an actuator to control the position of a bend roller to change the diameter of the tubing going into the receiving coiler apparatus as further described in the below embodiments of the invention and referred to as an indexing of the linear feed of the heat treated tubing.

In one embodiment of the invention formation of the HWC 10 begins with gas capture tubing head W1 being further out from the HWC's outside radius, for example, by distance W in FIGS. 1, 2(*a*) and 2(*b*) and the bend roller of the casting arm giving no bending to the tubing. Gas capture tubing head W1 is optionally used where an annealing process gas is supplied to the interior of the tubing in the annealing process and is purged from the interior of the tubing at the gas capture tubing head as the HWC is formed.

In the below embodiments of the invention all rotation process steps refer to either counterclockwise or clockwise rotation in alternative embodiments of the invention. For example if end user unwinding of the final product HWC is clockwise then all rotation process steps in formation of the HWC are counterclockwise; conversely if end user unwinding of the final product HWC is counterclockwise then all rotation process steps in formation of the HWC are counterclockwise.

In one embodiment of the invention the receiving coiler apparatus includes a turntable that can rotate horizontally counterclockwise or clockwise around, and lower along, the central axis $X_L$ of the HWC being formed in a process of the present invention. In embodiments where a turntable is utilized, rotation of the turntable performs the process of rotation of the linear feed of the heat treated metal tubing and lowering of the turntable performs the process of raising the linear feed of the heat treated metal tubing upwards between a lower and a higher coil layer.

In some embodiments of the invention, as the winding (rotation) of continuous linear feed of tubing 12 starts on the rotating turntable horizontal side shift distance W from gas capture tubing head W1 moves the tubing inward on the same layer as first layer L1 of the HWC with a 180 degree rotation of the turntable as shown in FIG. 1. At the same time the bend roller moves (inwards) to a tube bending radius of R1, which is the outer lay stack radius R1 of HWC 10 in FIG. 2(*b*) and the start of the first layer. The outer lay stack radius R1 is equal to the horizontal distance from the central axis $X_L$ of the HWC being formed to the interior center of the outer turn of the HWC as shown, for example, in FIG. 2(*b*). In some embodiments of the invention the process of forming the HWC and the resulting HWC starts at the beginning of first layer L1 if a process gas is not used.

The turntable in the next process step continues rotating 300 degrees (as indicated in FIG. 1) with the bend roll head in a constant position to form the single first (outer bottom) layer L1 turn of radius R1. The bend roll head is then indexed radially inwards (over 60 degrees of rotation) in layer L1 to start to form a second (inner) layer L1 turn of radius (R1 minus p) as the turntable rotates 300 degrees with the bend roll head in a constant position to form the single second layer L1 turn of radius (R1 minus p) where variable p is the radial pitch distance between adjacent turns of tubing in any layer as indicated, for example, in FIG. 2(b); the radial pitch distance is also equal to the distance between interior centers of adjacent turns of tubing 12 in any layer as shown in FIG. 2(b). The radially inwards indexing (decrementing) by a radial pitch distance and 300 degrees rotation process steps are repeated until the layer L1 inner radius of (Rx minus p) is formed. The variable x is the total number of turns in layer L1 so that each revolution of a turn radius from the first outer turn of radius R1 to the final inner turn of radius Rx is reduced or decremented by the radial pitch distance p to complete the first layer L1 of inward winding of tubing.

When the winding reaches the inner radius (Rx minus p) of layer L1, the bend roll head indexes (inwards) (over 60 degrees of rotation as indicated in FIG. 1) to radius Rx, which is the inner radius of HWC 10, and then the turntable drops (lowers) through a layer drop distance d, which in this example is equal to the outer diameter of tubing 12 as shown in FIG. 2(b) and equivalent to a process step of raising the linear feed of the tubing to the next higher level, to start the formation of second winding layer L2 on top of first winding layer L1. The turntable then continues rotating 300 degrees (as indicated in FIG. 1) with the bend roll head in a constant position to form a single turn of radius Rx radius, which is the transition winding from first L1 layer to the second L2 layer.

The bend roll head is then indexed (incremented) outwards (over 60 degrees of rotation as indicated in FIG. 1) to start forming the first (inner) turn of radius (Rx+p) of Layer 2 as the turntable rotates 300 degrees (as indicated in FIG. 1) with the bend roll head in a constant position to form a single turn of radius (Rx+p). The bend roll head is then indexed outwards (over 60 degrees of rotation) to start to form the second (outer) turn of radius (Rx+2p); as the turntable rotates 300 degrees with the bend roll head in a constant position to form a single turn of radius (Rx+2p). The radially outwards (incrementing) indexing by a radial pitch distance and 300 degrees rotation process steps are repeated until the outer radius R1 of HWC 10 is formed; that is, each revolution of radius in Layer 2 is increased (or incremented) by the radial pitch distance until second winding layer L2 is completed with outwards winding of tubing.

When the winding layer L2 reaches the outer radius R1 of HWC 10, the bend roll head indexes outwards (over 60 degrees of rotation as indicated in FIG. 1) to radius R1 and then the turntable drops (lowers) through the layer drop distance d, which is equivalent to a process step of raising the linear feed of the tubing to the next higher level, to start the formation of third winding layer L3 on top of the second winding layer L2. The turntable then continues rotating 360 degrees with the bend roll head in a constant position to form a single turn of radius R1, which is the outer radius of HWC 10 and is the transition winding from second layer L2 to third layer L3.

The turntable then rotates 300 degrees with the bend roll head in a constant position to form a single turn of radius R1. The bend roll head is then indexed radially inwards (over 60 degrees of rotation as indicated in FIG. 1) to start to form the second turn of radius (R1 minus p); as the turntable rotates 300 degrees (as indicated in FIG. 1) with the bend roll head in a constant position to form a single turn of (R1 minus p). The indexing and rotation process steps of the previous sentence are then repeated until the inner turn of (Rx−p) radius is formed; that is, in each revolution the radius is reduced by radial pitch distance p and third layer L3 completed with inwards winding.

When the winding reaches the inner radius (Rx minus p) of layer L3, the bend roll head indexes (inwards) (over 60 degrees of rotation) to radius (Rx minus p) and then the turntable drops (lowers) through the layer drop distance d, which is equivalent to a process step of raising the linear feed of the tubing to the next higher level, to start the formation of the fourth winding layer L4 on top of the third winding layer L3. The turntable then continues rotating 300 degrees with the bend roll head in a constant position to form a single turn of radius (Rx minus p), which is the transition winding from third L3 to fourth L4 layers.

The bend roll head is then indexed out (over 60 degrees of rotation as indicated in FIG. 1) to start forming the first turn of radius (Rx+2p) as the turntable rotates 300 degrees with the bend roll head in a constant position to form a single turn of radius (Rx+2p). The bend roll head is then indexed inwards (over 60 degrees of rotation as indicated in FIG. 1) to start to form the second turn of radius (Rx+3p), as the turntable rotates 300 degrees with the bend roll head in a constant position to form a single turn of radius (Rx+3p). The process step of the previous sentence is repeated with integer stepping of radial pitch distance p until the outer radius of R1 of HWC 10 is formed; that is, each revolution of radius is increased by an integer multiple pitch radius p until fourth winding layer L4 is completed with outwards winding.

When the winding layer L4 reaches the outer radius R1 of HWC 10, the bend roll head indexes outwards (over 60 degrees of rotation) to radius R1 and then the turntable drops (lowers) through the layer drop distance d, which is equivalent to a process step of raising the linear feed of the tubing to the next higher level, to start the formation of the fifth winding layer on top of the four winding layer L4. The turntable then continues rotating 360 degrees with the bend roll head in a constant position to form a single turn of R1, which is the transition winding from fourth layer L4 to the fifth layer above layer L4.

As illustrated in FIG. 2(b) the fifth through eighth winding layers group 4LS2 have the same winding layers geometry as winding layers group 4LS1 that make up the first through fourth winding layers. Similarly winding layers group 4LS3 and 4LS4 each have the same winding layers geometry as winding layers group 4LS1 that make up the first through fourth winding layers to complete the process of forming one embodiment of a HWC of the present invention.

In one example of the present invention a horizontally wound coil of a lay stack of a heat treated metal tubing is formed without a mandrel and from a continuous linear feed of the heat treated metal tubing having an outer diameter. The lay stack has an outer lay stack radius, R1, and an inner lay stack radius, Rx, where the variable x is the number of coil turns in a layer, and a radial pitch distance, p, equal to a distance between the interior centers of adjacent turns of the heat treated metal in a layer of the lay stack. The horizontally wound coil is formed as a repeating stacked four layer group identified as Layer 1, Layer 2, Layer 3 and Layer 4. Starting with Layer 1 of the first stack, a Layer 1 outer turn of tubing is formed with the Layer 1 outer turn having the outer lay stack radius over a 300 degrees rotation and an inner layer turn transition indexing distance of the radial pitch distance over a 60 degrees rotation. A plurality of sequential Layer 1 inner turns are formed where a Layer 1 inner turn radius of each successively inner one of the plurality of Layer 1 inner turns is decremented by the radial pitch distance from the inner turn radius of a previous inner one of the plurality of Layer 1 inner turns until the Layer 1 inner turn radius of a final one of the plurality of Layer 1 inner turns is equal to the inner lay stack radius minus the radial pitch distance. Each one of the plurality of Layer 1 inner turns has an inner turn radius over a 300 degrees rotation and a Layer 1 inner turn transition indexing of the radial pitch distance over 60 degrees rotation. After forming the final one of the plurality of Layer 1 inner turns, a Layer 1 to Layer 2 transition turn of the tubing having the inner lay stack radius over a 300 degrees rotation and a Layer 1 to Layer 2 transition indexing over a 60 degrees rotation is formed. A plurality of Layer 2 outer turns are formed where a Layer 2 outer turn radius of each successively outer one of the plurality of Layer 2 outer turns is incremented by the radial pitch distance from the outer turn radius of the preceding outer one of the plurality of Layer 2 outer turns until the outer turn radius of a final one of the plurality of Layer 2 outer turns is equal to the outer lay stack radius. Each one of the plurality of Layer 2 outer turns has an outer turn radius over a 300 degrees rotation and a Layer 2 turn transition indexing over the 60 degrees rotation. After the final Layer 2 outer turn is formed a Layer 2 to Layer 3 transition turn of the tubing is formed with the outer lay stack radius over a 300 degrees rotation and a Layer 2 to Layer 3 transition indexing over a 60 degree rotation. After forming the Layer 2 to Layer 3 transition turn a plurality of Layer 3 inner turns are sequentially formed where a Layer 3 inner turn radius of each successively inner one of the plurality of Layer 3 inner turns is decremented by the radial pitch distance from the inner turn radius of a preceding inner one of the plurality of Layer 3 inner turns until the inner turn radius of a final one of the plurality of Layer 3 inner turns is equal to the inner lay stack radius minus the radial pitch distance. Each one of the plurality of Layer 3 inner turns has an inner turn radius over a 300 degrees rotation and a Layer 3 turn transition indexing over a 60 degrees rotation. After forming the final Layer 3 inner turn, a Layer 3 to Layer 4 transition turn of the tubing with the inner lay stack radius over a 300 degrees rotation and a Layer 3 to Layer 4 transition indexing over a 60 degrees rotation is formed. After forming the Layer 3 to Layer 4 transition turn, a plurality of Layer 4 outer turns with a Layer 4 outer turn radius of each successively outer one of the plurality of Layer 4 outer turns is incremented by the radial pitch distance from the outer turn radius of the preceding outer one of the plurality of Layer 4 outer turns until the outer turn radius of a final one of the plurality of Layer 4 outer turns is equal to the outer lay stack radius. Each one of the plurality of Layer 4 outer turns has the outer turn radius over a 300 degrees rotation and a Layer 4 turn transition indexing over the 60 degrees rotation. After forming the final Layer 4 outer turn of the first four-layer group, a Layer 4 transition turn to another one of the repeating four-layer group of Layer 1, Layer 2, Layer 3 and Layer 4 with a 360 rotation of the heat treated metal tubing at the outer lay stack radius to form one example of a horizontally wound coil of the present invention. In other examples of the invention the HWC of the present invention comprises any plurality of the repeating four-layer group as required for a particular application.

FIG. 3 illustrates an alternative embodiment of a four layer group configuration comprising HWC 20 of the present invention. Reference to process steps of 60 degrees rotation and 300 degrees are to the angular indicia in FIG. 1.

In some embodiments of the invention, as the winding of continuous tubing 22 starts on the rotating turntable horizontal side shift distance W from gas capture tubing head W1 moves the tubing inward on the first layer L1' of HWC 20 with a 180 degree rotation of the turntable. At the same time the bend roller moves (inwards) to a tube bending radius of R1 which is the outer radius R1 of HWC 20 in FIG. 3 and the start of the first layer, and is equal to the horizontal distance from the central axis $X_L$ of the HWC being formed to the interior center of the outer turn of the HWC as shown, for example, in FIG. 3. In some embodiments of the invention the process of forming the HWC and the formed HWC starts at the first layer if a process gas is not used.

The turntable in the next process step continues rotating 300 degrees with the bend roll head in a constant position to form a single turn of radius R1. The bend roll head is then indexed radially inwards (over 60 degrees of rotation) to start to form the second turn of radius (R1 minus p); as the turntable rotates 300 degrees as indicated in FIG. 1 with the bend roll head in a constant position to form a single turn of radius (R1 minus p). The indexing and rotation process steps of the previous sentence are then repeated until the inner radius (Rx minus p) is formed where the variable p is the radial pitch distance between adjacent turns in a layer (which is equal to the distance between interior centers of adjacent turns of tubing) and the variable x is the total number of turns in the layer so that each revolution of a turn radius from the first outer turn of radius R1 to the final inner turn of radius Rx is reduced by the radial pitch distance p to complete the first layer L1' of inwards winding.

When the winding reaches the inner radius (Rx minus p) of layer L1', the bend roll head indexes (inwards) (over 60 degrees of rotation) to radius Rx, which is the inner radius of HWC 20, and then the turntable drops (lowers) through a layer drop distance as shown in the figure, which is equivalent to a process step of raising the linear feed of the tubing to the next higher level, to start the formation of second winding layer L2' on top of the first winding layer L1'. The turntable then continues rotating 300 degrees with the bend roll head in a constant position to form a single turn of radius Rx radius, which is the transition winding from first layer L1' to the second layer L2'.

The bend roll head is then indexed outwards (over 60 degrees of rotation) to start forming the first layer L2' turn of radius equal to the sum of Rx and one-half of the radial pitch distance p (Rx+0.5·p) as the turntable rotates 300 degrees with the bend roll head in a constant position to form a single turn of radius (Rx+0.5·p). The bend roll head is then indexed outwards (over 60 degrees of rotation) to start to form the second turn of layer L2' of radius equal to the sum of Rx and one and one-half of the radial pitch distance p (Rx+1.5·p) radius; as the turntable rotates 300 degrees with the bend roll head in a constant position to form a single turn of radius (Rx+1.5·p). The process step of the previous sentence is repeated with integer stepping of radial pitch distance p until the outer radius R1 of HWC 20 is formed; that is, each revolution of radius is increased by an integer multiple of the radial pitch distance p until second winding layer L2' is completed with outwards winding.

When the winding layer L2' reaches the outer radius R1 of HWC 20, the bend roll head indexes outwards (over 60 degrees of rotation) to radius R1 and then the turntable drops (lowers) through the layer drop distance as shown in the figure, which is equivalent to a process step of raising the linear feed of the tubing to the next higher level, to start the formation of third winding layer L3' on top of the second winding layer L2'. The turntable then continues rotating 360 degrees with the bend roll head in a constant position to form a single turn of radius R1, which is the outer radius of HWC 20 and the transition winding from second layer L2' to third layer L3'.

The turntable then rotates 300 degrees with the bend roll head in a constant position to form a single turn of radius R1. The bend roll head is then indexed radially inwards (over 60 degrees of rotation) to start to form the second turn of radius (R1 minus p); as the turntable rotates 300 degrees with the bend roll head in a constant position to form a single turn of (R1 minus p). The indexing and rotation process steps of the previous sentence are then repeated until the inner turn of (Rx minus p) radius is formed; that is, in each revolution the radius is reduced by the radial pitch distance p and third layer L3' is completed with inwards winding.

When the winding reaches the inner radius (Rx minus p) of layer L3', the bend roll head indexes (inwards) (over 60 degrees of rotation) to radius (Rx minus p) and then the turntable drops (lowers) through the layer drop distance as shown in the figure, which is equivalent to a process step of raising the linear feed of the tubing to the next higher level, to start the formation of the fourth winding layer L4' on top of the third winding layer L3'. The turntable then continues rotating 300 degrees with the bend roll head in a constant position to form a single turn of radius (Rx minus 0.5·p), which is the transition winding from third L3' to fourth L4' layers.

The bend roll head is then indexed out (over 60 degrees of rotation) to start forming the first turn of radius (Rx+1.5·p) as the turntable rotates 300 degrees with the bend roll head in a constant position to form a single turn of radius (Rx+1.5·p). The bend roll head is then indexed inwards (over 60 degrees of rotation) to start to form the second turn of radius (Rx+2.5·p), as the turntable rotates 300 degrees with the bend roll head in a constant position to form a single turn of radius (Rx+2.5·p). The process step of the previous sentence is repeated with integer stepping of p until the outer radius of R1 minus one-half of p (R1−0.5·p) of HWC 20 is formed; that is, each revolution of radius is increased by an integer multiple radial pitch distance p until fourth winding layer L4' is completed with outwards winding.

When the winding layer L4' reaches the outer radius R1 of HWC 20, the bend roll head indexes outwards (over 60 degrees of rotation) to radius R1 and then the turntable drops (lowers) through the layer drop distance as shown in the figure, to start the formation of the fifth winding layer on top of the four winding layer L4'. The turntable then continues rotating 360 degrees with the bend roll head in a constant position to form a single turn of R1, which is the transition winding from fourth layer L4' to the fifth layer above the fourth layer.

As illustrated in FIG. 3 the fifth through eighth winding layers formed from winding layers group 4LSS2 have the same winding layers geometry as winding layers group 4LSS1 that make up the first through fourth winding layers. Similarly winding layers group 4LSS3 and 4LSS4 each have the same winding layers geometry as winding layers group 4LSS1 that make up the first through fourth winding layers.

In one example of the present invention a horizontally wound coil of a lay stack of a heat treated metal tubing formed without a mandrel and from a continuous linear feed of the heat treated metal tubing having an outer diameter. The lay stack has an outer lay stack radius, R1, and an inner lay stack radius, Rx, where the variable x is the number of coil turns in a layer, and a radial pitch distance, p, equal to a distance between an interior centers of adjacent turns of the heat treated metal in a layer of the lay stack. The horizontally wound coil is formed as a repeating stacked four layer group identified as Layer 1, Layer 2, Layer 3 and Layer 4. Starting with Layer 1 of the first stack, a Layer 1 outer turn of tubing is formed with the Layer 1 outer turn having the outer lay stack radius over a 300 degrees rotation and an inner layer turn transition indexing distance of the radial pitch distance over a 60 degrees rotation. A plurality of sequential Layer 1 inner turns are formed where a Layer 1 inner turn radius of each successively inner one of the plurality of Layer 1 inner turns is decremented by the radial pitch distance from the inner turn radius of a previous inner one of the plurality of Layer 1 inner turns until the Layer 1 inner turn radius of a final one of the plurality of Layer 1 inner turns is equal to the inner lay stack radius minus the radial pitch distance. Each one of the plurality of Layer 1 inner turns has an the inner turn radius over a 300 degrees rotation and a Layer 1 turn transition indexing over the radial pitch distance 60 degrees rotation. After forming the final one of the plurality of Layer 1 inner turns a Layer 1 to Layer 2 transition turn of the tubing having the inner lay stack radius over a 300 degrees rotation and a Layer 1 to Layer 2 transition indexing of the radial pitch distance over a 60 degrees rotation is formed. The Layer 1 to Layer 2 transition turn is indexed over 60 degrees rotation to a first Layer 2 inner turn radius equal to the sum of the inner lay stack radius and a half of the radial pitch distance. The first Layer 2 turn of the tubing is formed with a first Layer 2 inner turn radius equal to the sum of the inner lay stack radius and half of the radial pitch distance over a 300 degrees rotation and indexing a first Layer 2 turn transition over 60 degrees rotation to the first of a plurality of Layer 2 outer turns with an inner turn radius equal to the first Layer 2 inner turn radius incremented by the radial pitch distance. The plurality of Layer 2 outer turns are sequentially formed where a Layer 2 outer turn radius of each successively outer one of the plurality of Layer 2 outer turns is incremented by the radial pitch distance from the outer turn radius of the preceding outer one of the plurality of Layer 2 outer turns until the outer turn radius of a final one of the plurality of Layer 2 outer turns is equal to the outer lay stack radius minus the radial pitch distance. Each one of the plurality of Layer 2 outer turns has the outer turn radius over a 300 degrees rotation and a Layer 2 turn transition indexing over the 60 degrees rotation. After the final one of the plurality of Layer 2 outer turns is formed a Layer 2 to Layer 3 transition turn of the tubing is formed with the outer lay stack radius over a 300 degrees rotation and a Layer 2 to Layer 3 transition indexing over a 60 degree rotation. After the Layer 2 to Layer 3 transition turn is formed a plurality of Layer 3 inner turns are sequentially formed where a Layer 3 inner turn radius of each successively inner one of the plurality of Layer 3 inner turns is decremented by the radial pitch distance from the inner turn radius of the preceding inner one of the plurality of Layer 3 inner turns until the inner turn radius of a final one of the plurality of Layer 3 inner turns is equal to the inner lay stack radius minus the radial pitch distance. Each one of the plurality of Layer 3 inner turns has the inner turn radius over a 300 degrees rotation and the Layer 3 turn transition indexing over the 60 degrees rotation. After the final one of the plurality of Layer 3 inner turns is formed a Layer 3 to Layer 4 transition turn of the tubing having the inner lay stack radius minus half of the radial pitch distance over a 300 degrees rotation and a Layer 3 to Layer 4 transition indexing over a 60 degrees rotation is formed. After the Layer 3 to Layer 4 transition turn is formed a plurality of Layer 4 outer turns is formed where a Layer 4 outer turn radius of each successively outer one of the plurality of Layer 4 outer turns is incremented by the radial pitch distance from the outer turn radius of the preceding outer one of the plurality of Layer 4 outer turns until the outer turn radius of a final one of the plurality of Layer 4 outer turns is equal to the outer lay stack radius minus half of the radial pitch distance. Each one of the plurality of Layer 4 outer turns has the outer turn radius over a 300 degrees rotation and the Layer 4 turn transition indexing over the 60 degrees rotation. After forming the final one of the plurality of Layer 4 outer turns a Layer 4 transition turn is formed to the repeating four-layer group of Layer 1, Layer 2, Layer 3 and Layer 4 with a 360 rotation of the heat treated metal tubing at the outer lay stack radius. In other examples of the invention the HWC of the present invention comprises any plurality of the repeating four-layer group as required for a particular application.

Figure 4:
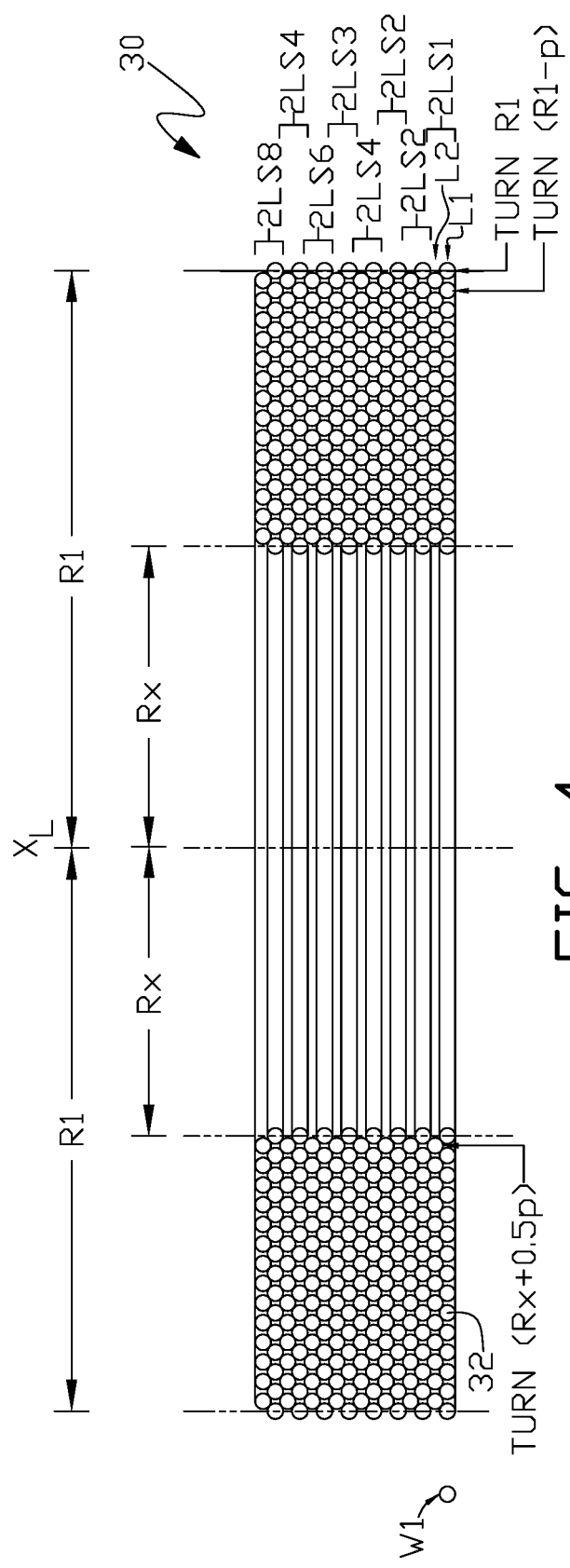
FIG. 4 is a cross sectional elevation view of another embodiment of a horizontally wound coil of a lay stack of heat treated metal tubing of the present invention where the final product end user horizontally wound coil geometry consists of four sequential two-layer groups of metal tubing as disclosed herein.

FIG. 4 illustrates an alternative embodiment of a two layer group configuration comprising HWC 30 of the present invention. Reference to process steps of 60 degrees rotation and 300 degrees are to the angular indicia in FIG. 1.

In one embodiment of the invention the winding of continuous tubing 32 from a linear feed of the tubing starts on the rotating turntable horizontal side shift distance W from gas capture tubing head W1 moves the tubing inward on the first (bottom or lower) layer L1 of HWC 30 with a 180 degree rotation of the turntable. At the same time the bend roller moves (inwards) to a tube bending radius of R1 which is the outer radius of HWC 30 and the start of first layer L1. In some embodiments of the invention the process of forming the HWC and the formed HWC starts at the first layer if a process gas is not used.

The turntable in the next process step continues rotating 300 degrees with the bend roll head in a constant position to form a single turn (winding) of radius R1. The bend roll head is then indexed radially inwards (over 60 degrees of rotation) to start to form the second turn of radius (R1 minus p); as the turntable rotates 300 degrees with the bend roll head in a constant position to form a single turn of radius (R1 minus p). The process in the previous sentence of indexing and rotation for forming a single turn is repeated until the inner radius (Rx minus p) is formed where the variable p is the radial pitch distance between adjacent turns in a layer (which is equal to the distance between interior centers of adjacent turns of tubing) and the variable x is the total number of turns in the layer so that each revolution of a turn radius from the first outer turn (or winding) of radius R1 to the final inner turn of radius Rx is reduced by the radial pitch distance p to complete the first layer L1 of inwards winding.

When the winding reaches the inner radius (Rx minus p) of layer L1, the bend roll head indexes (inwards) (over 60 degrees of rotation) to radius Rx, which is the inner radius of HWC 30, and then the turntable drops (lowers) through a layer drop distance as shown in the figure, which is equivalent to a process step of raising the linear feed of the tubing to the next highest level, to start the formation of second winding layer L2 on top of the first winding layer L1. The turntable then continues rotating 300 degrees with the bend roll head in a constant position to form a single turn of radius Rx radius, which is the transition winding from first layer L1 to the second layer L2 that is above first layer L1.

The bend roll head is then indexed outwards (over 60 degrees of rotation) to start forming the first turn of radius equal to the sum of the inner radius and half of the radial pitch distance (Rx+0.5·p) as the turntable rotates 300 degrees with the bend roll head in a constant position to form a single turn of radius (Rx+0.5·p). The bend roll head is then indexed outwards (over 60 degrees of rotation) to start to form the second turn of radius equal to the sum of the inner radius and 1.5 times the radial pitch distance (Rx+1.5·p) radius in the second Layer L2 as the turntable rotates 300 degrees with the bend roll head in a constant position to form the single turn of radius (Rx+1.5·p). The process step of the previous sentence is repeated with integer stepping (incrementing) of the radial pitch distance p until the outer radius (R1−0.5·p) of HWC 30 is formed; that is, each revolution of radius is increased or incremented by an integer multiple of the radial pitch distance p until second winding layer L2 is completed with outwards winding.

When the winding layer L2 reaches the outer radius R1 of HWC 30, the bend roll head indexes outwards (over 60 degrees of rotation) to radius R1 and then the turntable drops (lowers) through the layer drop distance as shown in the figure, which is equivalent to a process step of raising the linear feed of the tubing to the next highest level, to start the formation of the third winding layer L3 on top of the second winding layer L2. The turntable then continues rotating 360 degrees with the bend roll head in a constant position to form a single turn of R1, which is the transition winding from second layer L2 to the third layer L3.

As illustrated in FIG. 4 the second to fourth winding (paired) layers groups 2LS2, 2LS3 and 2LS4 have the same winding layers geometry as the winding layers in group 2LS1 that make up the first layer L1 and the second winding layer L2.

In one example of the present invention a horizontally wound coil of a lay stack of a heat treated metal tubing formed without a mandrel and from a continuous linear feed of the heat treated metal tubing having an outer diameter. The lay stack has an outer lay stack radius, R1, and an inner lay stack radius, Rx, where the variable x is the number of coil turns in a layer, and a radial pitch distance, p, equal to a distance between the interior centers of adjacent turns of the heat treated metal in a layer of the lay stack. The horizontally wound coil is formed as a repeating stacked two layer group identified as Layer 1 and Layer 2. Starting with Layer 1 of the first stack, a Layer 1 outer turn of tubing is formed with the Layer 1 outer turn having the outer lay stack radius over a 300 degrees rotation and an inner layer turn transition indexing distance of the radial pitch distance over a 60 degrees rotation. A plurality of sequential Layer 1 inner turns are formed where a Layer 1 inner turn radius of each successively inner one of the plurality of Layer 1 inner turns is decremented by the radial pitch distance from the inner turn radius of a previous inner one of the plurality of Layer 1 inner turns until the Layer 1 inner turn radius of a final one of the plurality of Layer 1 inner turns is equal to the inner lay stack radius minus the radial pitch distance. Each one of the plurality of Layer 1 inner turns has an inner turn radius over a 300 degrees rotation and the Layer 1 inner turn transition indexing radius over the 60 degrees rotation. The tubing is indexed to the inner lay stack radius and forms a Layer 1 to Layer 2 transition turn of the tubing with an inner lay stack radius over a 300 degrees rotation and a Layer 1 to Layer 2 transition indexing over a 60 degrees rotation. The tubing is indexed to a sum of the inner lay stack radius and half of the radial pitch distance and forms a first Layer 2 inner turn radius equal to the sum of the inner lay stack radius and half of the radial pitch distance over a 300 degrees rotation and indexing to a second Layer 2 turn transition over 60 degrees rotation to a second Layer 2 inner turn radius equal to the first Layer 2 inner turn radius incremented by the radial pitch distance. A plurality of Layer 2 outer turns are sequentially formed where a Layer 2 outer turn radius of each successively outer one of the plurality of Layer 2 outer turns is incremented by the radial pitch distance from the outer turn radius of a preceding outer one of the plurality of Layer 2 outer turns until the outer turn radius of a final one of the plurality of Layer 2 outer turns is equal to the outer lay stack radius minus half of the radial pitch distance. Each one of the plurality of Layer 2 outer turns has the outer turn radius over a 300 degrees rotation and the Layer 2 turn transition indexing over the 60 degrees rotation. A Layer 2 transition turn is formed to the repeating two-layer group of Layer 1 and Layer 2 with a 360 rotation of the heat treated metal tubing at the outer stack radius. In other examples of the invention the HWC of the present invention comprises any plurality of the repeating two-layer group as required for a particular application.

In each of the embodiments of the present invention a computer processor, such as a programmable logic controller, can be programmed by one skilled in the art so that the casting arm apparatus (including bend roller) and receiving box apparatus (including turntable) perform the above method of forming a HWC of the present invention.

Although a specific number of repeating four-layer (quadruple group) or two-layer (pair group) patterns are disclosed in examples of the present invention, in other embodiments of the invention any other number of the disclosed repeating four-layer or two-layer patterns may be used.

A HWC and method of forming a HWC of the present invention is of preferential use in forming a HWC product that can be designated as a jumbo HWC since the disclosed quadruple grouping or pair grouping of coil layers in the present invention supports forming a jumbo HWC with: outside level diameters (that is, twice the lay stack outer radius R1) in the range of 900 to 1200 mm; internal diameters (that is, twice the lay stack inner radius Rx) in the range from 600 to 700 mm; and metal tubing with outside diameters in the non-limiting range of 5 to 16 mm.

While no winding layer support structures are used in the examples of the invention, in other embodiments of the invention winding layer support structures may be provided during formation or after formation of the HWC to maintain the quadruple or pair group layer patterns.

Reference throughout this specification to "one example or embodiment," "an example or embodiment," "one or more examples or embodiments," or "different example or embodiments," for example, means that a particular feature may be included in the practice of the invention. In the description various features are sometimes grouped together in a single example, embodiment, figure, or description thereof for the purpose of streamlining the disclosure and aiding in the understanding of various inventive aspects.

The present invention has been described in terms of preferred examples and embodiments. Equivalents, alternatives and modifications, aside from those expressly stated, are possible and within the scope of the invention. Those skilled in the art, having the benefit of the teachings of this specification, may make modifications thereto without departing from the scope of the invention.

The invention claimed is:

1. A method of forming a horizontally wound coil of a lay stack of a heat treated metal tubing formed without a mandrel and from a linear feed of the heat treated metal tubing having an outer diameter, the lay stack having an outer lay stack radius and an inner lay stack radius, and a radial pitch distance equal to a distance between an interior centers of an adjacent turns of the heat treated metal tubing in a layer of the lay stack;
characterized by:
forming a repeating two-layer group of Layer 1 and Layer 2 of the heat treated metal tubing by:
forming a Layer 1 outer turn of the heat treated metal tubing, the Layer 1 outer turn having the outer lay stack radius over a Layer 1 300 degrees rotation and a Layer 1 inner turn transition indexing radius equal to the outer lay stack radius minus the radial pitch distance over a Layer 1 60 degrees rotation;
sequentially forming a plurality of Layer 1 inner turns where a Layer 1 inner turn radius of each successively inner one of the plurality of Layer 1 inner turns is decremented by the radial pitch distance from a previous Layer 1 inner turn radius of a previous inner one of the plurality of Layer 1 inner turns until a final Layer 1 inner turn radius of a Layer 1 final one of the plurality of Layer 1 inner turns is equal to the inner lay stack radius minus the radial pitch distance, each one of the plurality of Layer 1 inner turns having a Layer 1 inner turn radius over the Layer 1 300 degrees rotation and the Layer 1 inner turn transition indexing radius over the Layer 1 60 degrees rotation;
indexing the heat treated metal tubing to the inner lay stack radius and forming a Layer 1 to Layer 2 transition turn of the heat treated metal tubing, the Layer 1 to Layer 2 transition turn having the inner lay stack radius over a Layer 1 to Layer 2 transition turn 300 degrees rotation and a Layer 1 to Layer 2 transition indexing over a Layer 1 to Layer 2 transition turn 60 degrees rotation;
indexing the heat treated metal tubing to a sum of the inner lay stack radius and half of the radial pitch distance and forming a first Layer 2 inner turn radius equal to the sum of the inner lay stack radius and half of the radial pitch distance over a Layer 2 300 degrees rotation and indexing to a second Layer 2 turn transition over a Layer 2 60 degrees rotation to a second Layer 2 inner turn radius equal to the first Layer 2 inner turn radius incremented by the radial pitch distance;
sequentially forming a plurality of Layer 2 outer turns where a Layer 2 outer turn radius of each successively outer one of the plurality of Layer 2 outer turns is incremented by the radial pitch distance from a previous Layer 2 outer turn radius of a previous outer one of the plurality of Layer 2 outer turns until the outer turn radius of a final one of the plurality of Layer 2 outer turns is equal to the outer lay stack radius minus half of the radial pitch distance, each one of the plurality of Layer 2 outer turns having the outer turn radius over the Layer 2 300 degrees rotation and the Layer 2 turn transition indexing over the Layer 2 60 degrees rotation; and
forming a Layer 2 transition turn to the repeating two-layer group of Layer 1 and Layer 2 with a 360 degrees rotation of the heat treated metal tubing at the outer lay stack radius.

2. A method of forming a horizontally wound coil of a lay stack of a heat treated metal tubing formed without a mandrel and from a linear feed of the heat treated metal tubing having an outer diameter, the lay stack having an outer lay stack radius and an inner lay stack radius, and a radial pitch distance equal to a distance between an interior centers of an adjacent turns of the heat treated metal tubing in a layer of the lay stack;
characterized by:
forming a repeating four-layer group of Layer 1, Layer 2, Layer 3 and Layer 4 of the heat treated metal tubing by:

forming a Layer 1 outer turn of the heat treated metal tubing, the Layer 1 outer turn having the outer lay stack radius over a Layer 1 300 degrees rotation and a Layer 1 inner turn transition indexing of the radial pitch distance over a Layer 1 60 degrees rotation;

sequentially forming a plurality of Layer 1 inner turns where a Layer 1 inner turn radius of each successively inner one of the plurality of Layer 1 inner turns is decremented by the radial pitch distance from a previous Layer 1 inner turn radius of a previous inner one of the plurality of Layer 1 inner turns until a final Layer 1 inner turn radius of a Layer 1 final one of the plurality of Layer 1 inner turns is equal to the inner lay stack radius minus the radial pitch distance, each one of the plurality of Layer 1 inner turns having a Layer 1 inner turn radius over the Layer 1 300 degrees rotation and the Layer 1 inner turn transition indexing of the radial pitch distance over the Layer 1 60 degrees rotation;

forming a Layer 1 to Layer 2 transition turn of the heat treated metal tubing, the Layer 1 to Layer 2 transition turn having the inner lay stack radius over a Layer 1 to Layer 2 transition turn 300 degrees rotation and a Layer 1 to Layer 2 transition indexing over a Layer 1 to Layer 2 transition turn 60 degrees rotation;

sequentially forming a plurality of Layer 2 outer turns where a Layer 2 outer turn radius of each successively outer one of the plurality of Layer 2 outer turns is incremented by the radial pitch distance from a previous Layer 2 outer turn radius of a previous outer one of the plurality of Layer 2 outer turns until a final Layer 2 outer turn radius of a Layer 2 final one of the plurality of Layer 2 outer turns is equal to the outer lay stack radius, each one of the plurality of Layer 2 outer turns having a Layer 2 outer turn radius over a Layer 2 300 degrees rotation and a Layer 2 outer layer turn transition indexing of the radial pitch distance over a Layer 2 60 degrees rotation;

forming a Layer 2 to Layer 3 transition turn of the heat treated metal tubing, the Layer 2 to Layer 3 transition turn having a Layer 2 to Layer 3 transition turn outer lay stack radius over a Layer 2 to Layer 3 transition turn 300 degrees rotation a Layer 2 to Layer 3 transition indexing over a 60 degree rotation;

sequentially forming a plurality of Layer 3 inner turns where a Layer 3 inner turn radius of each successively inner one of the plurality of Layer 3 inner turns is decremented by the radial pitch distance from a previous Layer 3 inner turn radius of a previous inner one of the plurality of Layer 3 inner turns until a final Layer 3 inner turn radius of a Layer 3 final one of the plurality of Layer 3 inner turns is equal to the inner lay stack radius minus the radial pitch distance, each one of the plurality of Layer 3 inner turns having a Layer 3 inner turn radius over a Layer 3 300 degrees rotation and the Layer 3 inner layer turn transition indexing of the radial pitch distance over the Layer 3 60 degrees rotation;

forming a Layer 3 to Layer 4 transition turn of the heat treated metal tubing, the Layer 3 to Layer 4 transition turn having a Layer 3 to Layer 4 transition turn inner lay stack radius over a Layer 3 to Layer 4 transition turn 300 degrees rotation and a Layer 3 to Layer 4 transition indexing over a Layer 3 to Layer 4 transition turn 60 degrees rotation;

sequentially forming a plurality of Layer 4 outer turns where a Layer 4 outer turn radius of each successively outer one of the plurality of Layer 4 outer turns is incremented by the radial pitch distance from a previous Layer 4 outer turn radius of a previous outer one of the plurality of Layer 4 outer turns until a final Layer 4 outer turn radius of a Layer 4 final one of the plurality of Layer 4 outer turns is equal to the outer lay stack radius, each one of the plurality of Layer 4 outer turns having a Layer 4 outer turn radius over a Layer 4 300 degrees rotation and a Layer 4 outer layer turn transition indexing of the radial pitch distance over a Layer 4 60 degrees rotation; and forming a Layer 4 transition to the repeating four-layer group of Layer 1, Layer 2, Layer 3 and Layer 4 of the heat treated metal tubing with a 360 degrees rotation of the heat treated metal tubing at the outer lay stack radius.

3. A method of forming a horizontally wound coil of a lay stack of a heat treated metal tubing formed without a mandrel and from a linear feed of the heat treated metal tubing having an outer diameter, the lay stack having an outer lay stack radius and an inner lay stack radius, and a radial pitch distance equal to a distance between an interior centers of an adjacent turns of the heat treated metal tubing in a layer of the lay stack;

characterized by:

forming a repeating four-layer group of Layer 1, Layer 2, Layer 3 and Layer 4 of the heat treated metal tubing by:

forming a Layer 1 outer turn of the heat treated metal tubing, the Layer 1 outer turn having the outer lay stack radius over a Layer 1 300 degrees rotation and a Layer 1 inner turn transition indexing of the radial pitch distance over a Layer 1 60 degrees rotation;

sequentially forming a plurality of Layer 1 inner turns where a Layer 1 inner turn radius of each successively inner one of the plurality of Layer 1 inner turns is decremented by the radial pitch distance from a previous Layer 1 inner turn radius of a previous inner one of the plurality of Layer 1 inner turns until a final Layer 1 inner turn radius of a Layer 1 final one of the plurality of Layer 1 inner turns is equal to the inner lay stack radius minus the radial pitch distance, each one of the plurality of Layer 1 inner turns having a Layer 1 inner turn radius over the Layer 1 300 degrees rotation and the Layer 1 turn transition indexing of the radial pitch distance over the Layer 1 60 degrees rotation;

forming a Layer 1 to Layer 2 transition turn of the heat treated metal tubing having a Layer 1 to Layer 2 transition turn inner lay stack radius over a Layer 1 to Layer 2 transition turn 300 degrees rotation and a Layer 1 to Layer 2 transition indexing of the radial pitch distance over a Layer 1 to Layer 2 transition turn 60 degrees rotation;

indexing the Layer 1 to Layer 2 transition turn over 60 degrees rotation to a first Layer 2 inner turn radius equal to a sum of the inner lay stack radius and a half of the radial pitch distance;

forming the first Layer 2 turn of the heat treated metal tubing having the first Layer 2 inner turn radius equal to the sum of the inner lay stack radius and the half of the radial pitch distance over a Layer 2 300 degrees rotation and indexing a first Layer 2 turn transition over a Layer 2 60 degrees rotation to a first Layer 2 outer turn of a plurality of Layer 2 outer turns with an inner turn radius equal to the first Layer 2 inner turn radius incremented by the radial pitch distance;

sequentially forming the plurality of Layer 2 outer turns where a Layer 2 outer turn radius of each successively outer one of the plurality of Layer 2 outer turns is incremented by the radial pitch distance from the outer turn radius of a previous outer one of the plurality of Layer 2 outer turns until a final outer turn radius of a final one of the plurality of Layer 2 outer turns is equal to the outer lay stack radius minus the radial pitch distance, each one of the plurality of Layer 2 outer turns having an outer turn radius over a Layer 2 300 degrees rotation and a Layer 2 outer layer turn transition indexing of the radial pitch distance over a Layer 2 60 degrees rotation;

forming a Layer 2 to Layer 3 transition turn of the heat treated metal tubing having a Layer 2 to Layer 3 transition turn outer lay stack radius over a Layer 2 to Layer 3 transition turn 300 degrees rotation and a Layer 2 to Layer 3 transition indexing over a Layer 2 to Layer 3 transition turn 60 degree rotation;

sequentially forming a plurality of Layer 3 inner turns where a Layer 3 inner turn radius of each successively inner one of the plurality of Layer 3 inner turns is decremented by the radial pitch distance from a previous Layer 3 inner turn radius of a previous inner one of the plurality of Layer 3 inner turns until a final Layer 3 inner turn radius of a Layer 3 final one of the plurality of Layer 3 inner turns is equal to the inner lay stack radius minus the radial pitch distance, each one of the plurality of Layer 3 inner turns having a Layer 3 inner turn radius over a Layer 3 300 degrees rotation and the Layer 3 inner layer turn transition indexing of the radial pitch distance over the Layer 3 60 degrees rotation;

forming a Layer 3 to Layer 4 transition turn of the heat treated metal tubing having a Layer 3 to Layer 4 transition inner lay stack radius minus half of the radial pitch distance over a Layer 3 to Layer 4 transition turn 300 degrees rotation and a Layer 3 to Layer 4 transition indexing over a Layer 3 to Layer 4 transition turn 60 degrees rotation;

sequentially forming a plurality of Layer 4 outer turns where a Layer 4 outer turn radius of each successively outer one of the plurality of Layer 4 outer turns is incremented by the radial pitch distance from a previous Layer 4 outer turn radius of a previous outer one of the plurality of Layer 4 outer turns until a final Layer 4 outer turn radius of a Layer 4 final one of the plurality of Layer 4 outer turns is equal to the outer lay stack radius minus half of the radial pitch distance, each one of the plurality of Layer 4 outer turns having a Layer 4 outer turn radius over a Layer 4 300 degrees rotation and a Layer 4 outer layer turn transition indexing over the a Layer 4 60 degrees rotation; and forming a Layer 4 transition to the repeating four-layer group of Layer 1, Layer 2, Layer 3 and Layer 4 with a 360 degrees rotation of the heat treated metal tubing at the outer lay stack radius.

\* \* \* \* \*